US012667063B2

(12) United States Patent (10) Patent No.: US 12,667,063 B2
Meng et al. (45) Date of Patent: Jun. 30, 2026

(54) ANTI-BLOCKING DRIP INFILTRATION PIPE STRIP

(71) Applicant: SHANDONG CHANGJIANG WATER-SAVING IRRIGATION TECHNOLOGY CO., LTD., Jinan (CN)

(72) Inventors: Shiming Meng, Jinan (CN); Xianwu Meng, Jinan (CN); Juan Du, Jinan (CN); Qunying Sun, Jinan (CN)

(73) Assignee: SHANDONG CHANGJIANG WATER-SAVING IRRIGATION TECHNOLOGY CO., LTD., Jinan (CN)

( * ) Notice: Subject to any disclaimer, the term of this patent is extended or adjusted under 35 U.S.C. 154(b) by 195 days.

(21) Appl. No.: 18/647,344

(22) Filed: Apr. 26, 2024

(65) Prior Publication Data

US 2024/0381820 A1      Nov. 21, 2024

(30) Foreign Application Priority Data

May 16, 2023    (CN) ......................... 202310559543.6

(51) Int. Cl.
    *A01G 25/06*        (2006.01)
    *A01G 25/02*        (2006.01)
(52) U.S. Cl.
    CPC ............. *A01G 25/06* (2013.01); *A01G 25/02* (2013.01); *A01G 25/023* (2013.01)
(58) Field of Classification Search
    CPC ...... A01G 25/02; A01G 25/023; A01G 25/06; Y02A 40/22
    See application file for complete search history.

(56) References Cited

U.S. PATENT DOCUMENTS

| | | | | | |
|---|---|---|---|---|---|
| 5,816,742 | A | * | 10/1998 | Cordewener | ......... E02B 11/005 |
| | | | | | 405/45 |
| 2005/0258279 | A1 | * | 11/2005 | Harrold | ................. A01G 25/02 |
| | | | | | 156/203 |
| 2010/0282859 | A1 | * | 11/2010 | Helbig | ................... A01G 25/06 |
| | | | | | 239/11 |

FOREIGN PATENT DOCUMENTS

| | | | | | |
|---|---|---|---|---|---|
| CN | 204598879 | U | * | 9/2015 | ............. A01G 25/06 |
| CN | 205357490 | U | * | 7/2016 | ............. A01G 25/02 |
| TW | M525050 | U | * | 7/2016 | ............. A01G 25/02 |

OTHER PUBLICATIONS

English translation of TWM525050U (Year: 2016).*
English translation of CN205357490U (Year: 2016).*
English translation of CN204598879U (Year: 2015).*

* cited by examiner

*Primary Examiner* — Scott J Walthour
(74) *Attorney, Agent, or Firm* — JEEN IP LAW, LLC

(57)                ABSTRACT

An anti-blocking drip infiltration pipe strip is provided, relating to the technical field of agricultural irrigation water delivery. The anti-blocking drip infiltration pipe strip includes a drip infiltration pipe strip, a dripper is arranged on the drip infiltration pipe strip, a shielding layer is connected to an outer side of the drip infiltration pipe strip along a length direction through sewing, the dripper is covered by the shielding layer, and drip irrigation water seeps out along a sewing gap of the shielding layer. Blockage of the dripper of the pipeline due to external buried soil and negative pressure is avoided, a water flow at the drip opening is stable, and the uniformity of the drip irrigation infiltration amount is effectively improved.

5 Claims, 4 Drawing Sheets

ANTI-BLOCKING DRIP INFILTRATION PIPE STRIP

CROSS-REFERENCE TO RELATED APPLICATION

This patent application claims the benefit and priority of Chinese Patent Application No. 202310559543.6 filed with the China National Intellectual Property Administration on May 16, 2023, the disclosure of which is incorporated by reference herein in its entirety as part of the present application.

TECHNICAL FIELD

The present disclosure relates to the technical field of agricultural irrigation and water delivery, and in particular to an anti-blocking drip infiltration pipe strip.

BACKGROUND

There are many forms of agricultural irrigation, such as furrow irrigation, sprinkler irrigation, drip irrigation, and infiltration irrigation, among which infiltration irrigation is the most scientific and advanced. After irrigation, the soil remains loose, the soil structure is not damaged, and the soil surface is not hardened. Low soil moisture on the earth's surface can reduce ground evaporation. Buried pipelines can reduce the occupied area. The irrigation amount is low, and the irrigation efficiency is high.

However, the existing infiltration irrigation pipe has the following shortcomings: the dripper of the pipeline is blocked due to the external buried soil and negative pressure; and it is difficult to accurately control the infiltration amount as the water flow at the drip opening is unstable.

SUMMARY

Based on the problems above, an objective of the present disclosure is to provide an anti-blocking drip infiltration pipe strip. The present disclosure provides the following technical solution.

An anti-blocking drip infiltration pipe strip includes a drip infiltration pipe strip, a dripper arranged on the drip infiltration pipe strip, and a shielding layer connected to an outer side of the drip infiltration pipe strip along a length direction through sewing, and the dripper is covered by the shielding layer. Drip irrigation water seeps out along a sewing gap of the shielding layer.

Preferably, the shielding layer is made of a cloth material with a permeable function, and the drip irrigation water flowing out of the dripper seeps out along pores of the cloth material.

Preferably, the shielding layer is partially wrapped around the drip infiltration pipe strip, both side edges of the shielding layer along the length direction are sewed onto the drip infiltration pipe strip, and a sewing thread of the shielding layer is embedded into a pipe wall of the drip irrigation pipe strip.

Preferably, in case that the shielding layer is completely wrapped around the drip irrigation strip, both side edges of the shielding layer along the length direction are partially overlapped and sewed together.

Preferably, the cloth material is non-woven cloth or anti-corrosion organic material permeable cloth.

Preferably, the shielding layer is made of a plastic cloth strip, and several turbulent protrusions are arranged on an inner side wall of the shielding layer.

Preferably, in case that the shielding layer is partially wrapped around the drip infiltration pipe strip, both side edges of the shielding layer along the length direction are sewed onto the drip infiltration pipe strip, and a sewing thread of the shielding layer is embedded into a pipe wall of the drip irrigation pipe strip.

Preferably, the shielding layer is completely wrapped around the drip irrigation strip, and both side edges of the shielding layer along the length direction are partially overlapped and sewed together.

Preferably, several transverse heat-sealing structures are arranged at interval along the length direction of the drip infiltration pipe strip. The shielding layer and the sewing thread of the shielding layer are heat-sealed to the drip infiltration pipe strip by the transverse heat-sealing structures.

Compared with the prior art, the present disclosure has beneficial effects as follows:

Blockage of the dripper of the pipeline due to external buried soil and negative pressure is avoided, the water flow at the drip opening is stable, and the uniformity of the drip irrigation infiltration amount is effectively improved.

BRIEF DESCRIPTION OF THE DRAWINGS

The present disclosure is further described below with reference to accompanying drawings.

Figure 1:
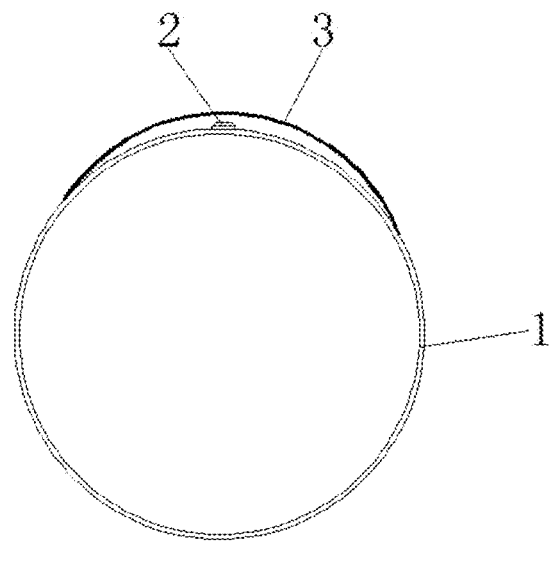
FIG. 1 is a schematic diagram of a cross-sectional structure of an anti-blocking drip infiltration pipe strip according to Embodiment 1 of the present disclosure.

In the drawings: 1—drip infiltration pipe strip; 2—dripper; 3—shielding layer; 301—turbulent protrusion; 4—transverse heat-sealing structure; 5—cloth releasing machine; 6—cloth guiding machine; 7—sewing machine; 8—traction machine; 9—winding device; 10—heat-sealing machine.

DETAILED DESCRIPTION OF THE EMBODIMENTS

In order to make the technical problem to be solved by the present disclosure, technical solutions and advantages of the present disclosure more clearly, the present disclosure is further described in detail below with reference to the accompanying drawings and embodiments.

Embodiment 1

Figure 2:
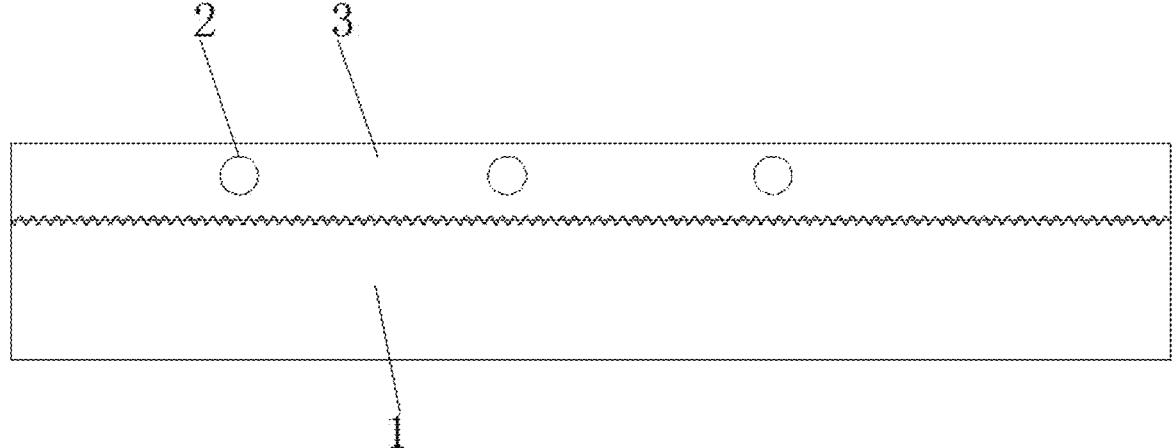
FIG. 2 is a schematic diagram of a front-view structure of an anti-blocking drip infiltration pipe strip according to Embodiment 1 of the present disclosure.

As shown in FIG. 1 and FIG. 2, an anti-blocking drip infiltration pipe strip is provided, including a drip infiltration pipe strip 1. A dripper 2 is arranged on the drip infiltration pipe strip 1, and a shielding layer 3 is connected to an outer side of the drip infiltration pipe strip 1 along a length direction through sewing. The dripper 2 is overlapped with the shielding layer 3, and the dripper 2 is covered by the shielding layer 3 to prevent the dripper 2 from directly contacting with soil, thus solving the problem of blockage of the dripper of the pipeline due to external buried soil and negative pressure. Moreover, drip irrigation water flowing out of the dripper 2 seeps out along a sewing gap of the shielding layer 3.

In this embodiment, the shielding layer 3 is made of a cloth material with a permeable function, and the drip irrigation water flowing out of the dripper 2 seeps out along pores of the cloth material, and thus the uniformity of infiltration in soil through drip irrigation is improved. The cloth material is non-woven cloth or anti-corrosion organic material permeable cloth.

In this embodiment, the shielding layer 3 is partially wrapped around the drip infiltration pipe strip 1, both side edges of the shielding layer 3 along the length direction are sewed onto the drip infiltration pipe strip 1, and a sewing thread of the shielding layer 3 is embedded into a pipe wall of the drip irrigation pipe strip 1. The sewing thread does not penetrate through the pipe wall of the drip infiltration pipe strip 1, and a sewing edge of the shielding layer 3 is far away from the dripper 2.

Figure 3:
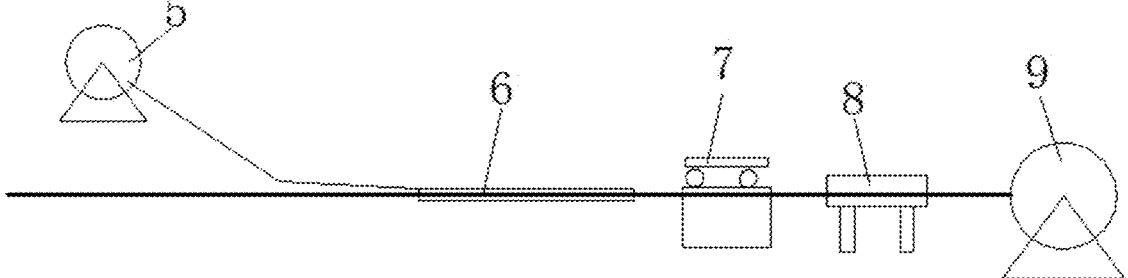
FIG. 3 is a schematic diagram of a layout of a production device of an anti-blocking drip infiltration pipe strip according to Embodiment 1 of the present disclosure.

Based on the structure of the anti-blocking drip infiltration pipe strip in this embodiment, as shown in FIG. 3, a production line for producing the anti-blocking drip infiltration pipe strip is disclosed. The production line includes a cloth releasing machine 5, a cloth guiding machine 6, a sewing machine 7, a traction machine 8, and a winding device 9 arranged in sequence. The drip infiltration pipe strip 1 passes through the sewing machine 7 and the traction machine 8 in sequence and then is wound by the winding device 9. The cloth guiding machine 6 is arranged at one side of the drip infiltration pipe strip 1 to guide the cloth material to the sewing machine 7, and the sewing machine 7 is used to sew both side edges of the cloth material onto the drip infiltration pipe strip 1.

Embodiment 2

Figure 4:
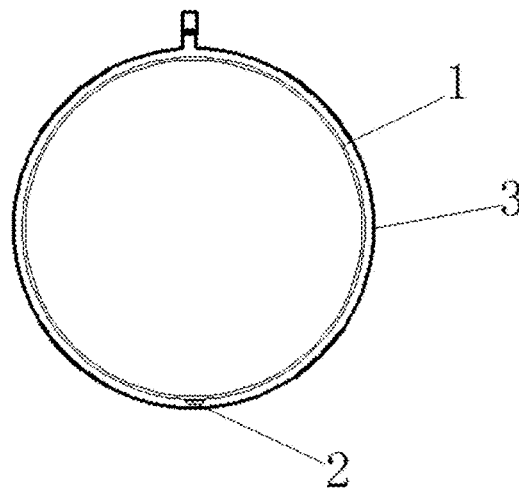
FIG. 4 is a schematic diagram of a cross-sectional structure of an anti-blocking drip infiltration pipe strip according to Embodiment 2 of the present disclosure.
Figure 5:
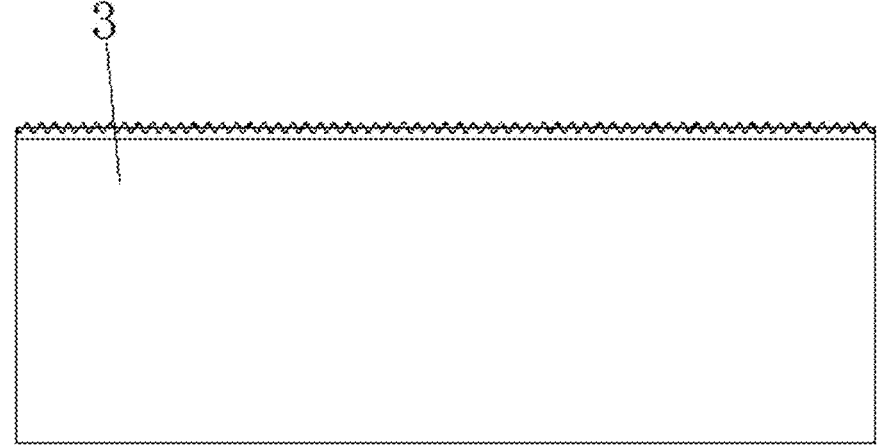
FIG. 5 is a schematic diagram of a front-view structure of an anti-blocking drip infiltration pipe strip according to Embodiment 2 of the present disclosure.

In this embodiment, as shown in FIG. 4 and FIG. 5, the shielding layer 3 is made of a cloth material with a permeable function. The shielding layer 3 is completely wrapped around the drip irrigation strip 1, both side edges of the shielding layer 3 along the length direction are partially overlapped and sewed together to form a permeable cloth sleeve which is sleeved outside the drip infiltration pipe strip 1. In this embodiment, drip irrigation water flowing out of the dripper 2 seeps out slowly along the pores of the cloth material and the sewing gap. Both side edges of the shielding layer 3 along the length direction are partially overlapped and sewed, thus preventing tree roots from penetrating into an interlayer between the drip infiltration pipe strip 1 and the shielding layer 3.

The remaining structure of the anti-blocking drip infiltration pipe strip is the same as that in Embodiment 1.

Figure 6:
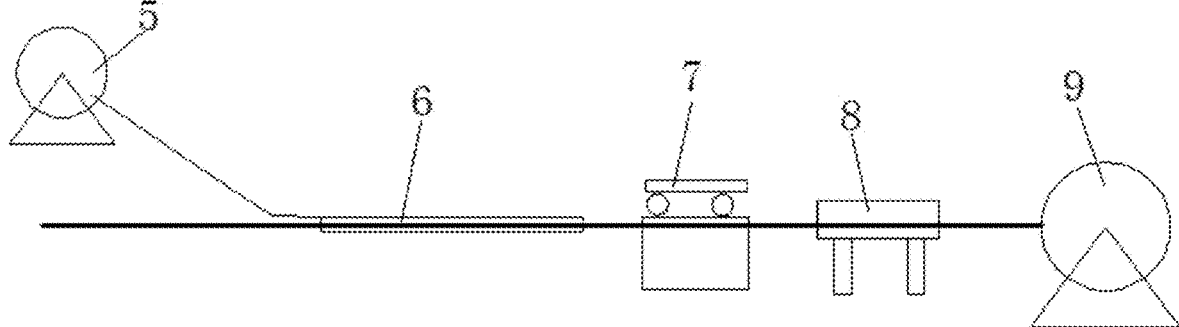
FIG. 6 is a schematic diagram of a layout of a production device of an anti-blocking drip infiltration pipe strip according to Embodiment 2 of the present disclosure.

Based on the structure of the anti-blocking drip infiltration pipe strip in this embodiment, as shown in FIG. 6, a production line for producing the anti-blocking drip infiltration pipe strip is disclosed. The production line includes a cloth releasing machine 5, a cloth guiding machine 6, a sewing machine 7, a traction machine 8, and a winding device 9 arranged in sequence. The drip infiltration pipe strip 1 passes through the sewing machine 7 and the traction machine 8 in sequence and then is wound by the winding device 9. The cloth guiding machine 6 is arranged at one side of the drip infiltration pipe strip 1 to guide the cloth material to the sewing machine 7, and the sewing machine 7 is used to sew both side edges of the cloth material together. In this embodiment, a cloth guiding groove with a diameter larger than a diameter of the drip irrigation pipe is formed in the cloth guiding machine 6, and the cloth strip is wound around the drip infiltration pipe strip 1 along a longitudinal extension direction of the drip irrigation pipe.

Embodiment 3

Figure 7:
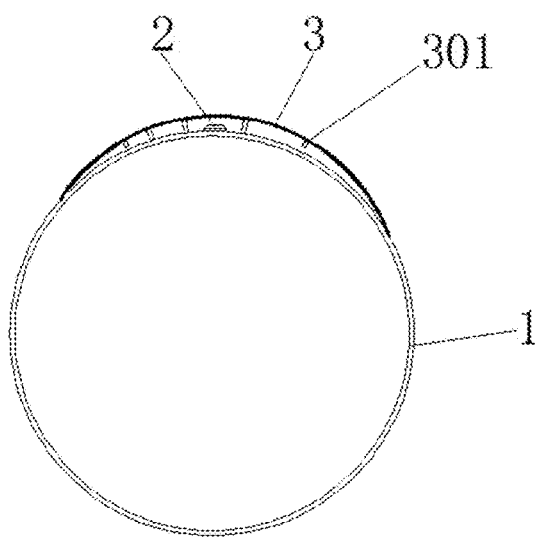
FIG. 7 is a schematic diagram of a cross-sectional structure of an anti-blocking drip infiltration pipe strip according to Embodiment 3 of the present disclosure.
Figure 8:
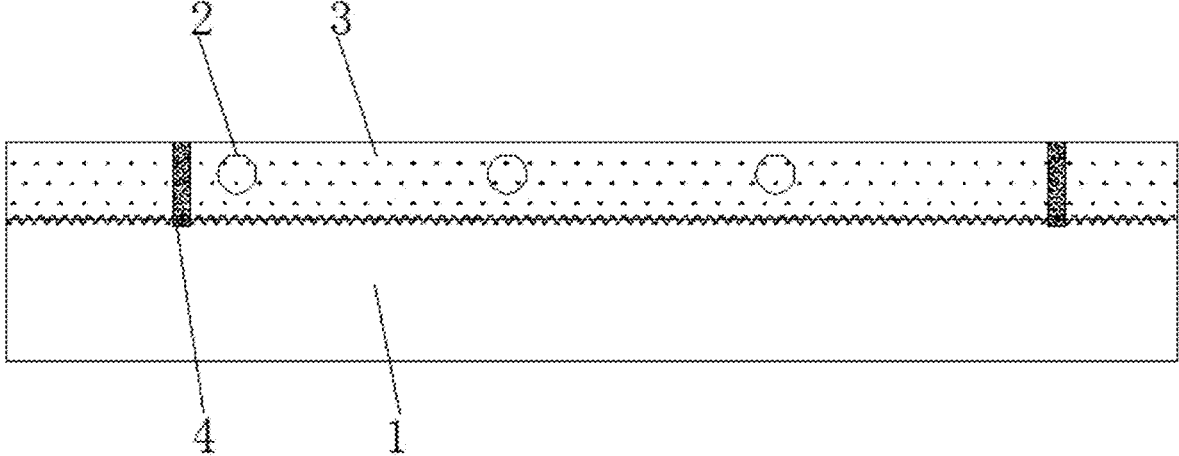
FIG. 8 is a schematic diagram of a front-view structure of an anti-blocking drip infiltration pipe strip according to Embodiment 3 of the present disclosure.

In this embodiment, as shown in FIG. 7 and FIG. 8, the shielding layer is made of a plastic cloth strip, which is an impermeable structure, and several turbulent protrusions 301 are arranged on an inner side wall of the plastic cloth strip.

In this embodiment, the shielding layer 3 is partially wrapped around the drip infiltration pipe strip 1, both side edges of the shielding layer 3 along the length direction are sewed onto the drip infiltration pipe strip 1, and a sewing thread of the shielding layer 3 is embedded into a pipe wall of the drip irrigation pipe strip 1. The sewing thread does not penetrate through the pipe wall of the drip infiltration pipe strip 1, and a sewing edge of the shielding layer 3 is far away from the dripper 2.

In this embodiment, the drip irrigation water flowing out of the dripper 2 flows to an interlayer between the plastic cloth strip and the drip infiltration pipe strip 1. Due to the turbulent protrusions 301, it is convenient for the water in the interlayer to circulate longitudinally and transversely, and then the water can slowly seep out along a sewing gap of the plastic cloth strip. It should be noted that the turbulent protrusions 301 form a support at the sewing part of the plastic strip, it is convenient to form the gap to facilitate the drip irrigation water to seep out. The several turbulent protrusions 301 also play a role in compensating for the secondary turbulence of the water flow in the interlayer. The height of the several turbulent protrusions 301 is controlled within 1 mm.

In this embodiment, several transverse heat-sealing structures 4 are arranged at interval along the length direction of the drip infiltration pipe strip 1, and the shielding layer 3 and the sewing thread of the shielding layer 3 are heat-sealed to the drip infiltration pipe strip 1 by the transverse heat-sealing structures 4. Therefore, the lift height of the drip infiltration pipe strip 1 can be significantly increased when used on high slopes. The remaining structure of the anti-blocking drip infiltration pipe strip is the same as that in Embodiment 1.

Figure 9:
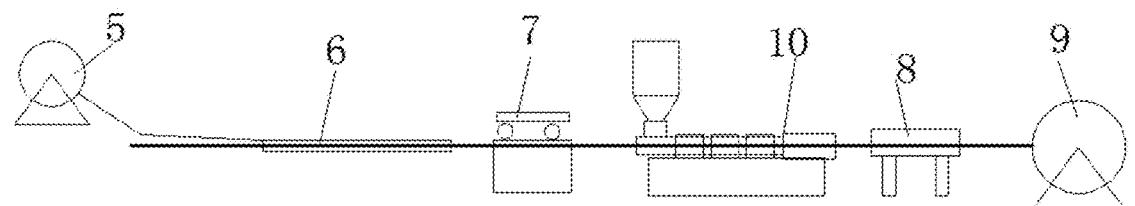
FIG. 9 is a schematic diagram of a layout of a production device of an anti-blocking drip infiltration pipe strip according to Embodiment 3 of the present disclosure.

Based on the structure of the anti-blocking drip infiltration pipe strip in this embodiment, as shown in FIG. 9, a production line for producing the anti-blocking infiltration pipe strip is disclosed. The production line includes a cloth releasing machine 5, a cloth guiding machine 6, a sewing machine 7, a heat-sealing machine 10, a traction machine 8, and a winding device 9 arranged in sequence. The drip infiltration pipe strip 1 passes through the sewing machine 7 and the traction machine 8 in sequence and then is wound by the winding device 9. The cloth guiding machine 6 is arranged at one side of the drip infiltration pipe strip 1 to guide the cloth material to the sewing machine 7, and the sewing machine 7 is used to sew two side edges of the cloth material onto the drip infiltration pipe strip 1. The heat-sealing machine 10 is used to intermittently and transversely fuse the sewed drip infiltration pipe strip 1 with the plastic cloth strip to form a transverse heat-sealing structure 4.

Embodiment 4

Figure 10:
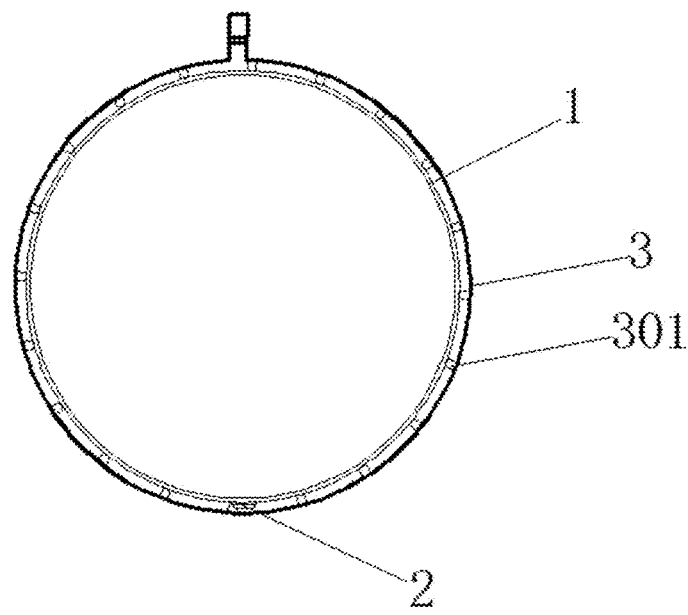
FIG. 10 is a schematic diagram of a cross-sectional structure of an anti-blocking drip infiltration pipe strip according to Embodiment 4 of the present disclosure.
Figure 11:
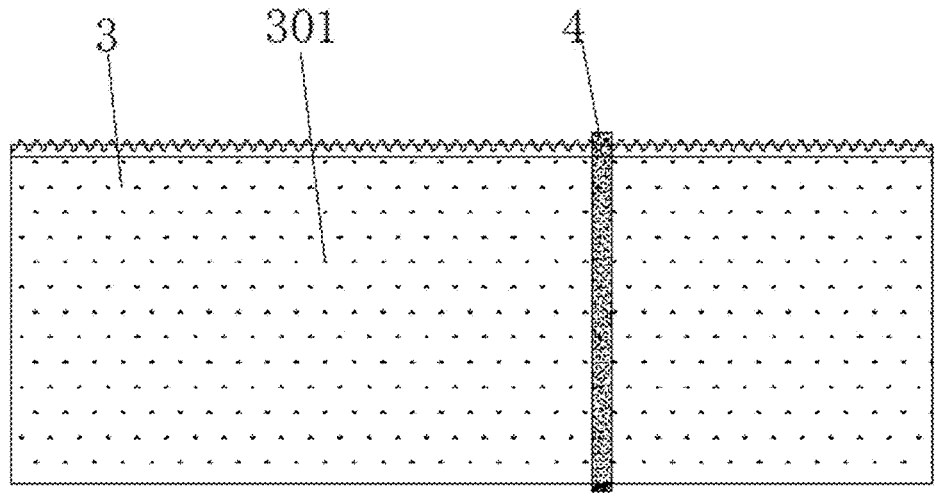
FIG. 11 is a schematic diagram of a front-view structure of an anti-blocking drip infiltration pipe strip according to Embodiment 4 of the present disclosure.

In this embodiment, as shown in FIG. 10 and FIG. 11, the shielding layer 3 is made of a plastic cloth strip without a permeable function. The shielding layer 3 is completely wrapped around the drip irrigation pipe strip 1, and both side edges of the shielding layer 3 along the length direction are partially overlapped and then sewed together to form a cloth sleeve which is sleeved outside the drip infiltration pipe strip 1. In this embodiment, drip irrigation water flowing out of the dripper 2 seeps out slowly along the sewing gap of the plastic cloth strip.

Several turbulent protrusions 301 are arranged on an inner side wall of the plastic cloth strip. The drip irrigation water flowing out of the dripper 2 flows to an interlayer between the plastic cloth strip and the drip infiltration pipe strip 1. Due to the turbulent protrusions 301, it is convenient for the water in the interlayer to circulate longitudinally and transversely, and then the water can slowly seep out along a sewing gap of the plastic cloth strip. It should be noted that the turbulent protrusions 301 form a support at the sewing part of the plastic strip, it is convenient to form the gap to facilitate the drip irrigation water to seep out. The several turbulent protrusions 301 also play a role in compensating for the secondary turbulent of the water flow in the interlayer.

In this embodiment, several transverse heat-sealing structures 4 are arranged at interval along the length direction of the drip infiltration pipe strip 1, and the shielding layer 3 and the sewing thread of the shielding layer 3 are heat-sealed to the drip infiltration pipe strip 1 by the transverse heat-sealing structures 4. Therefore, the lift height of the drip infiltration pipe strip 1 can be significantly increased when used on high slopes.

The remaining structure of the anti-blocking drip infiltration pipe strip is the same as that in Embodiment 3.

Figure 12:
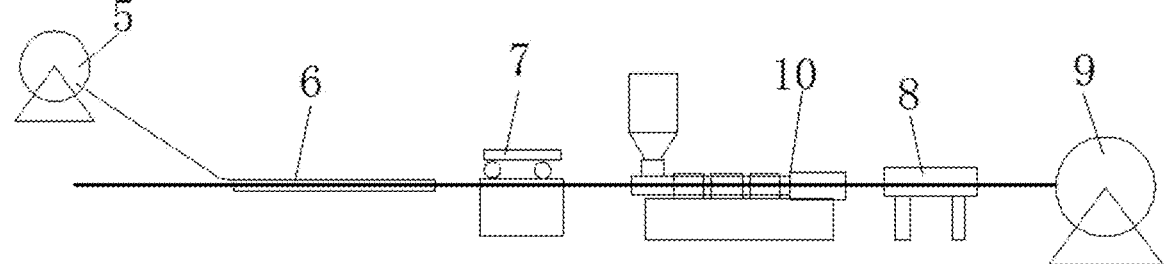
FIG. 12 is a schematic diagram of a layout of a production device of an anti-blocking drip infiltration pipe strip according to Embodiment 4 of the present disclosure.

Based on the structure of the anti-blocking drip infiltration pipe strip in this embodiment, as shown in FIG. 12, a production line for producing the anti-blocking drip infiltration pipe strip is disclosed. The production line includes a cloth releasing machine 5, a cloth guiding machine 6, a sewing machine 7, a heat-sealing machine 10, a traction machine 8, and a winding device 9 arranged in sequence. The drip infiltration pipe strip 1 passes through the sewing machine 7 and the traction machine 8 in sequence and then is wound by the winding device 9. The cloth guiding machine 6 is arranged at one side of the drip infiltration pipe strip 1 to guide the cloth material to the sewing machine 7, and the sewing machine 7 is used to sew both side edges of the cloth material together. The heat-sealing machine 10 is used to intermittently and transversely fuse the sewed drip infiltration pipe strip 1 with the plastic cloth strip to form a transverse heat-sealing structure 4. In this embodiment, a cloth guiding groove greater than a diameter of a drip irrigation pipe is arranged on the cloth guiding machine 6, and the cloth strip is wound around the drip infiltration pipe strip 1 along a longitudinal extension direction of the drip irrigation pipe.

The above embodiments are only the description of the preferred mode of the present disclosure, and are not intended to limit the scope of the present disclosure. Various modifications and improvements made by those of ordinary skill in the art to the technical scheme of the present disclosure without departing from the design spirit of the present disclosure shall fall within the scope of protection determined by the claims of the present disclosure.

What is claimed is:

1. An anti-blocking drip infiltration pipe strip assembly, comprising a drip infiltration pipe strip (1), a dripper (2) arranged on the drip infiltration pipe strip (1), and a shielding layer (3) connected to an outer side of the drip infiltration pipe strip (1) along a length direction through sewing, the dripper (2) is covered by the shielding layer (3), and drip irrigation water seeps out along a sewing gap of the shielding layer (3);

wherein the shielding layer (3) is partially wrapped around the drip infiltration pipe strip (1), the shielding layer (3) comprises two side edges along the length direction, wherein both side edges of the shielding layer (3) along the length direction are sewed onto the drip infiltration pipe strip (1), and a sewing thread of the shielding layer (3) is embedded into a pipe wall of the drip irrigation pipe strip (1).

2. The anti-blocking drip infiltration pipe strip assembly according to claim 1, wherein the shielding layer (3) is made of a cloth material with a permeable function, and the drip irrigation water flowing out of the dripper (2) seeps out along pores of the cloth material.

3. The anti-blocking drip infiltration pipe strip assembly according to claim 2, wherein the cloth material is non-woven cloth or anti-corrosion organic material permeable cloth.

4. The anti-blocking drip infiltration pipe strip assembly according to claim 1, wherein the shielding layer (3) is made of a plastic cloth strip, and several turbulent protrusions (301) are arranged on an inner side wall of the shielding layer (3).

5. The anti-blocking drip infiltration pipe strip assembly according to claim 4, wherein several transverse heat-sealing structures (4) are arranged at intervals along the length direction of the drip infiltration pipe strip (1), and the shielding layer (3) and the sewing thread of the shielding layer (3) are heat-sealed to the drip infiltration pipe strip (1) by the transverse heat-sealing structures (4).

* * * * *